United States Patent [19]
Lam et al.

[11] Patent Number: 5,525,091
[45] Date of Patent: Jun. 11, 1996

[54] MULTI-ADJUSTABLE ROW TRANSFER TOOL

[75] Inventors: Chung-Fai Lam, San Jose; Yew-Nam Yong, Fremont, both of Calif.

[73] Assignee: International Business Machines Corporation, Armonk, N.Y.

[21] Appl. No.: 267,106

[22] Filed: Jun. 24, 1994

[51] Int. Cl.$^6$ ........................................ B24B 49/00
[52] U.S. Cl. ........................................ 451/1; 451/5
[58] Field of Search ........................... 451/1, 5; 29/603

[56] References Cited

U.S. PATENT DOCUMENTS

5,065,483  11/1991  Zammit ........................... 451/1
5,214,589  5/1993  Tang ................................ 451/1

*Primary Examiner*—Maurina T. Rachuba
*Attorney, Agent, or Firm*—Baker, Maxham, Jester & Meador

[57] ABSTRACT

A transfer tool is provided with a block which has an elongated slot. With the elongated slot a beam is formed in a lower portion of the block. The beam can be adjusted for row bow of a slider row which includes magnetic heads. Three holes extend through the block to the slot, opening three exposed portions of the beam, one exposed portion being centrally located and the other two exposed portions being located laterally on each side of the central portion near the ends of the beam. The ends of the slot have transverse slots which allow the beam to flex more readily when pressures are applied to the exposed portions near the ends of the beam. Pins extend through the holes with their downward ends engaging the exposed beam portions. Actuators are employed to apply appropriate forces to the pins so that the beam can be selectively adjusted to compensate for row bow of the slider row. Because of the transverse slots at the ends of the elongated slot, forces applied to the beam near its ends result in a desirable curved adjustment of the slider row. This enables a more uniform lapping of the slider row and the magnetic heads thereon.

12 Claims, 6 Drawing Sheets

*FIG. 8*
*(Prior Art Loading)*

*FIG. 9*
*(Prior Art Row Deformation)*

FIG. 10
(Loading)

FIG. 11
(Row Deformation)

MULTI-ADJUSTABLE ROW TRANSFER TOOL

CROSS-REFERENCE TO RELATED PATENT

This application is related to commonly assigned U.S. Pat. No. 4,914,868, which is incorporated by reference herein. The present invention is an improvement of the transfer tool described in U.S. Pat. No. 4,914,868.

BACKGROUND OF THE INVENTION

1. Field of the Invention

The present invention relates to a transfer tool for holding a row of magnetic heads on a slider bar so that the magnetic heads and slider bar can be lapped by abrasive grinding with minimum row bow.

2. Description of the Related Art

In a disk drive, magnetic heads are suspended over the flat surface of a magnetic disk for writing and reading data. The magnetic heads are mounted on a slider which, in turn, is supported by a suspension for positioning the magnetic heads against the surface of the magnetic disk in a transducing relationship. When the disk is rotated in the disk drive, the slider rides on a cushion of air (an "air bearing") over the surface of the disk. The height of the slider and magnetic heads over the surface of the disk is called the flying height which may be in the order of 0.075 µm.

A thin film write head includes first and second pole pieces which terminate in pole tips. The pole tips are separated by a transducing gap. The length of the gap is kept as small as possible, preferably sub-micron, so that high frequency data signals can be recorded. This increases the linear density of information written by the write head. Further, the width of the write head is kept small, less than 3 µm, so that the track density of information written by the write head is high. The linear density and the track density determine the areal density of a storage medium written by the write head, which is a measure of how many bits per square inch can be written to the medium.

When the pole tips of a write head become small, it is very difficult to control the quality of the writing signal. This is because the first and second pole pieces of the write head, which terminate in the pole tips, are large. The magnetic flux carried by the first and second pole pieces must enter the pole tips without the pole tips becoming saturated. In order to accomplish this objective, the throat height of the write head must be carefully controlled. The throat height is the distance between the air bearing surface (ABS) of the head to the zero throat. The ABS is the surface of the head which is supported by the air bearing. The zero throat is the linear demarcation in the magnetic head where the pole tips transition into the larger pole pieces and is generally located at the apex of one or more insulation layers within the head. A typical throat height is on the order of 1.5 µm with a tolerance of 0.5 µm.

Batch fabrication of magnetic heads can be accomplished by thin film deposition of row/column array of magnetic heads on a substrate, the substrate providing slider material for the magnetic heads. Alternatively, the slider material can be fabricated also by thin film deposition, in which case the thin film deposition takes place on a wafer. After deposition of the magnetic heads, the substrate is cut into rows so that each row comprises a linear array of slider-mounted magnetic heads. Each row is then bonded to a transfer tool so that the sliders and magnetic heads thereon can be lapped with an abrasive material. Each magnetic head is reduced in size by lapping until a target throat height is achieved.

A significant problem in lapping is that the transfer tool has a slight amount of flexure regardless of the precautions taken to make it as rigid as possible. This problem makes it difficult to lap all of the magnetic heads on a row within a small tolerance (typically about 0.5 mm). Transfer tools are made of hardened stainless steel, but still flex. Without compensation, flexure of the tool causes a row to bow in various directions. This is known in the industry as "row bow". When row bow occurs, some of the magnetic heads are overlapped, while other magnetic heads are underlapped. A desired throat height is not achieved for all of the heads.

In commonly assigned U.S. Pat. No. 4,914,868, to Church et al., a transfer tool is adjusted for row bow by applying multiple discrete forces to the transfer tool. The transfer tool is a generally rectangular block which has an elongated slot forming a beam. A row of magnetic heads on slider material (hereinafter, a "slider row") is affixed to the beam. A pin extends through a hole in the block to a central location of the beam where a force can be directly applied. This compensates for negative row bow in which the slider row assumes a concave configuration. Forces can also be applied on an outer surface of the transfer tool at locations longitudinally displaced from the center location of the slider row to compensate for positive row bow, where the slider row assumes a convex configuration. Heretofore, with this prior art arrangement the desirable tolerance of 0.5 µm, mentioned hereinabove, cannot be achieved.

SUMMARY OF THE INVENTION

The present invention is an improvement of the tool disclosed and claimed in U.S. Pat. No. 4,914,868 of Church et al. We have discovered that by applying the two longitudinally displaced forces directly on the beam near its supported ends, all of the magnetic heads can be lapped within a tolerance of 0.5 µm. This is accomplished by providing two longitudinally displaced holes through the transfer tool so that pins can directly contact the beam near its supported ends. With this arrangement, each of the prior art middle pin and the longitudinally displaced pins of the present invention can be selectively forced directly against the beam of the transfer tool to compensate for row bow. While three forces are described, it should be understood that additional forces could be directly applied to the beam as desired.

An object of the present invention is to improve compensation for row bow of the transfer tool described in U.S. Pat. No. 4,914,868.

Another object is to provide a transfer tool which can be adjusted to compensate for row bow with a tolerance of 0.5 µm, or less.

A further object is to apply a plurality of forces directly on a beam of a transfer tool so as to more accurately compensate for row bow of a slider row of magnetic heads.

Other objects will become more apparent when considered in light of the following description of the invention.

DETAILED DESCRIPTION OF THE PREFERRED EMBODIMENT

Figure 1:
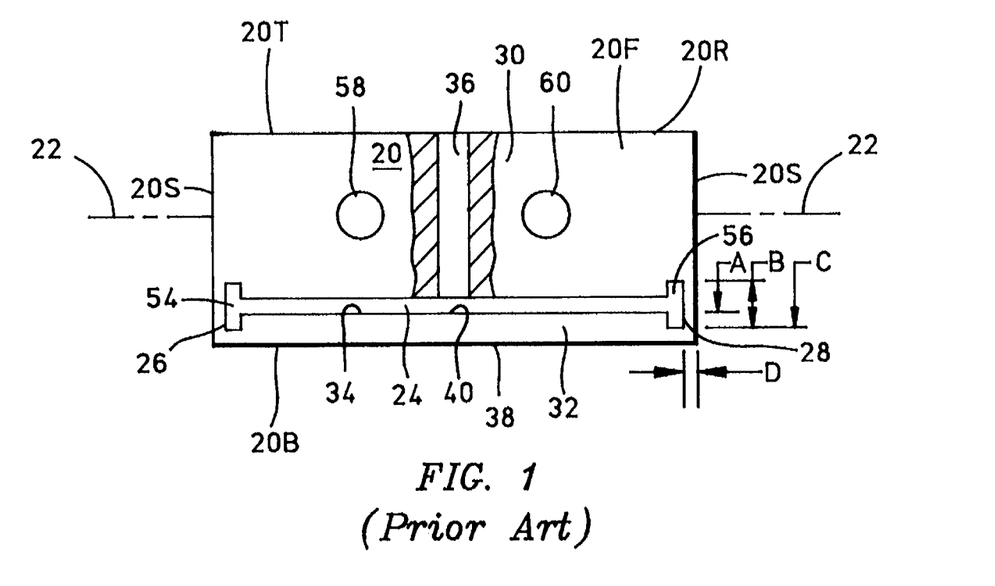
FIG. 1 is a front view of a block of a prior art transfer tool.

Referring now to the drawings, wherein like reference numerals designate like or similar part throughout the several views, there is shown in FIG. 1 a prior art block 20 of the transfer tool of U.S. Pat. No. 4,914,868. The block 20 is an elongated substantially rectangular stainless steel block having top and bottom surfaces 20T and 20B bounded by front and rear walls 20F and 20R and a pair of sidewalls 20S. The block has a longitudinal axis 22. An elongated slot 24 lies in a plane substantially parallel to the longitudinal axis 22 of the block and extends in width completely through the block from the front wall 20F to the rear wall 20R. The elongated slot has opposite ends 26 and 28 which stop short of the sidewalls 20S of the block.

The slot 24 divides the block into a top main body portion 30 and a bottom beam portion 32. The bottom beam portion 32 has a bearing surface 34 located internally within the block and a lapping face which is a portion of the bottom surface 20B of the block. The beam 32 is capable of being flexed transverse to the longitudinal axis 22 of the block. A central hole 36 extends through the block from the top surface 20T to the elongated slot 24. The hole 36 exposes a central portion 40 of the bearing surface 34 of the beam to the top surface 20T of the block.

Figure 2:
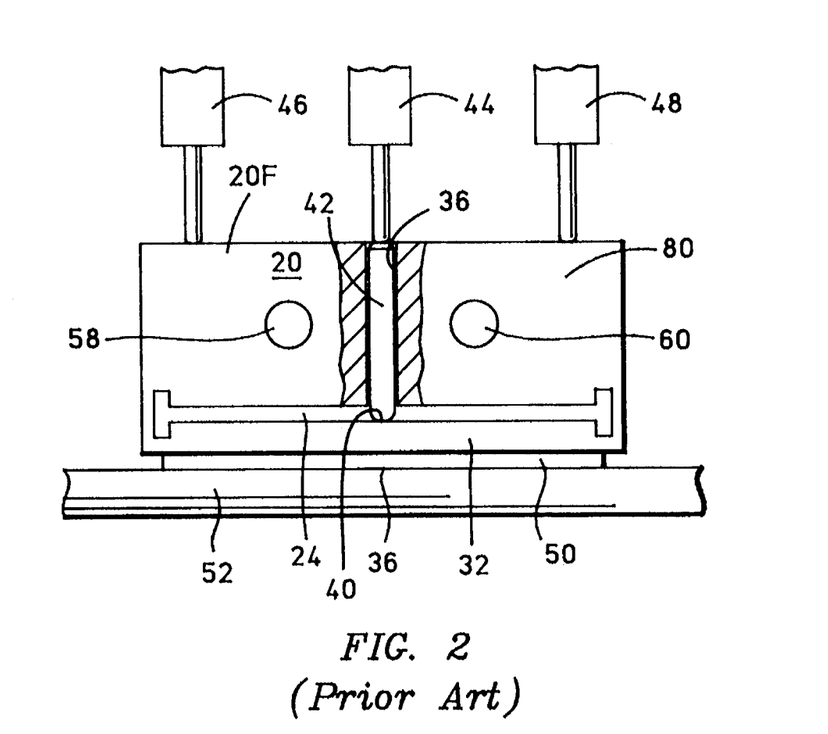
FIG. 2 is a front view of the prior art transfer tool with a slider row of magnetic heads mounted thereon in position for lapping by a grinding wheel.
Figure 3:
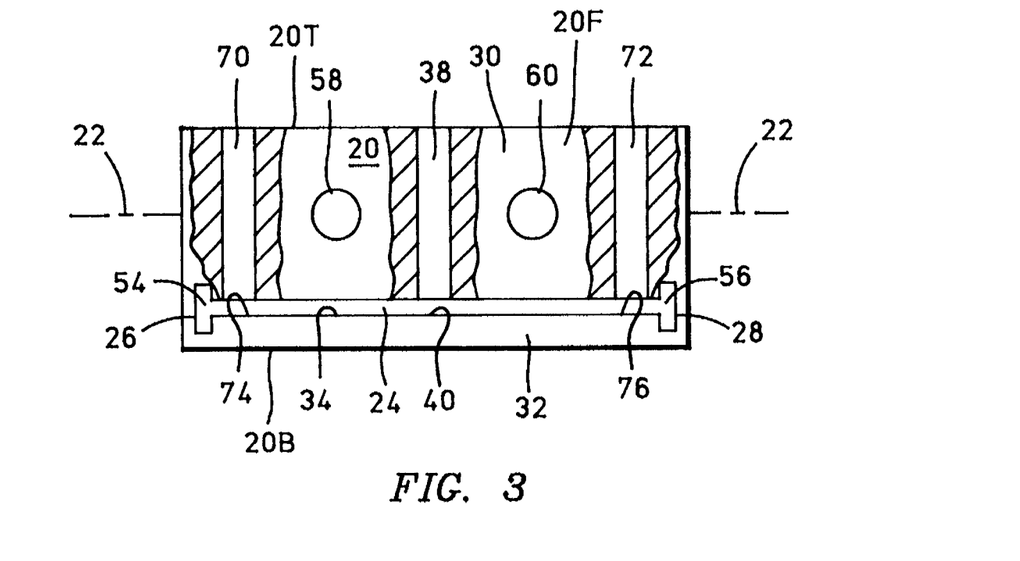
FIG. 3 is a front view of a block of the present transfer tool.

As shown in FIG. 2, a pin 42 is slidably mounted through the hole 36 and has a bottom end for engaging the central exposed portion 40 of the beam 32. A top end of the pin 42 is engaged by a centrally located actuator 44 for applying a downward force on the pin 38. This causes the bottom end of the pin 38 to apply a downward central force on the beam 34 at 40 to compensate for negative row bow, namely where the slider row assumes a concave position along the lapping face 38 of the transfer tool. The prior art transfer tool employs longitudinally displaced actuators 46 and 48, one on each side of the central actuator 44 for applying downward forces on the top surface 20T of the block in the proximity of the sidewalls 20S. These actuators are controlled by control circuitry which will be described in more detail hereinafter. The purpose of the actuators 46 and 48 is to apply loads for compensating for positive row bow, namely where the slider row assumes a convex position along the lapping face 38 of the transfer tool.

Figure 6:
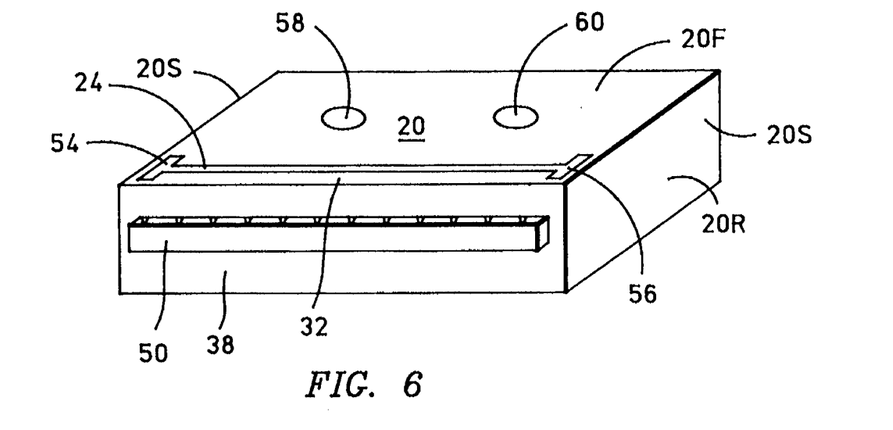
FIG. 6 is a bottom isometric view of the block portion of the present transfer tool.

In FIG. 2 a slider row 50 is shown affixed to the lapping face 36 of the transfer tool by any suitable means such as epoxy bonding. The slider row 50 is a row of slider material upon which a plurality of magnetic write heads (see FIG. 6) have been constructed in a colinear array. The slider row 50 has a length which is substantially equal to the length of the elongated slot 24. Located below the slider row 50 is a grinding wheel 52 for lapping the row of magnetic heads. If the row of magnetic heads is planar, the grinding wheel 52 will uniformly lap the magnetic heads to a desired throat height. Typically the row of magnetic heads is not planar and/or the block 20 of the transfer tool flexes slightly when the row of magnetic heads is lapped by the wheel 52 causing the row of slider material and the magnetic heads thereon to be unevenly lapped. This can cause a sizable number of the heads to be rendered inoperative for their intended purpose. Proper lapping of the magnetic heads at each end of the slider row is especially troublesome since they tend to bow outward toward the grinding wheel causing them to be overlapped.

The elongated slot 24 of the prior art transfer tool is uniquely configured at its opposite ends 26 and 28. Transverse slots 54 and 56 extend completely through the block from the front wall 20F to the rear wall 20R and are located at the ends 26 and 28, respectively, of the elongated slot 24. Each of the transverse slots 54 and 56 extends in length substantially perpendicularly to the longitudinal axis 22 of the block 20 making the slot 24 generally H-shaped. These transverse slots are particularly useful in combination with the present invention which will be described in detail hereinafter. As is stated in U.S. Pat. No. 4,914,868 the length of the slot 24 as well as dimensions A, B, C, and D shown in FIG. 1 are critical for precisely compensating for row bow. These dimensions define the stiffness and the deflection of the beam 32 to form its deflection curve. The patent states that by proper choice of slot dimensions A, B, C, and D, which can be calculated, the deflecting beam 32 can be center-loaded to produce a deflection curve which closely approximates a second-degree polynomial. As shown in FIGS. 1 and 2, the block 20 is provided with a pair of spaced-apart guide holes 58 and 60 which extend completely through the block 20 from its front wall 20F to its rear wall 20R. Guide pins, not shown, are inserted in these guide holes 58 and 60 for maintaining the block in a fixed position in relationship to the grinding wheel 52. The loading of the prior art transfer tool, as shown in FIG. 2, has not been satisfactory for lapping the row of magnetic heads within a desirable tolerance of 0.5 μm from the throat height.

Figure 4:
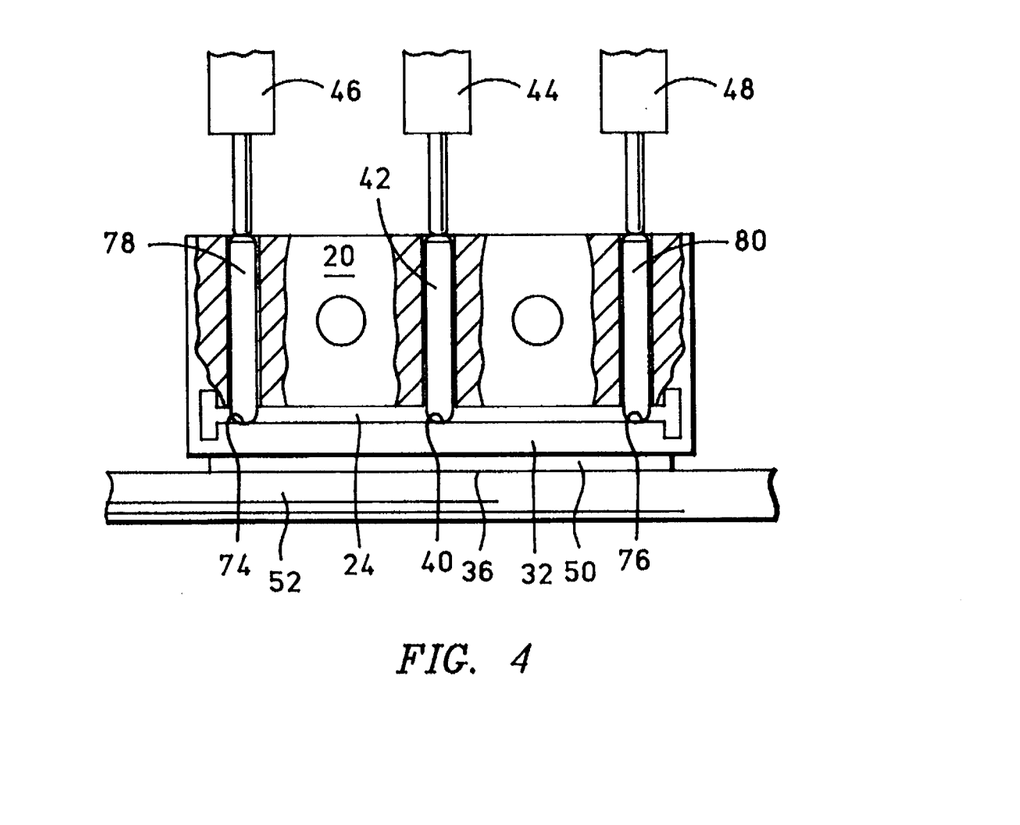
FIG. 4 is a front view of the present transfer tool with a row of magnetic heads mounted thereon for lapping by a grinding wheel.
Figure 5:
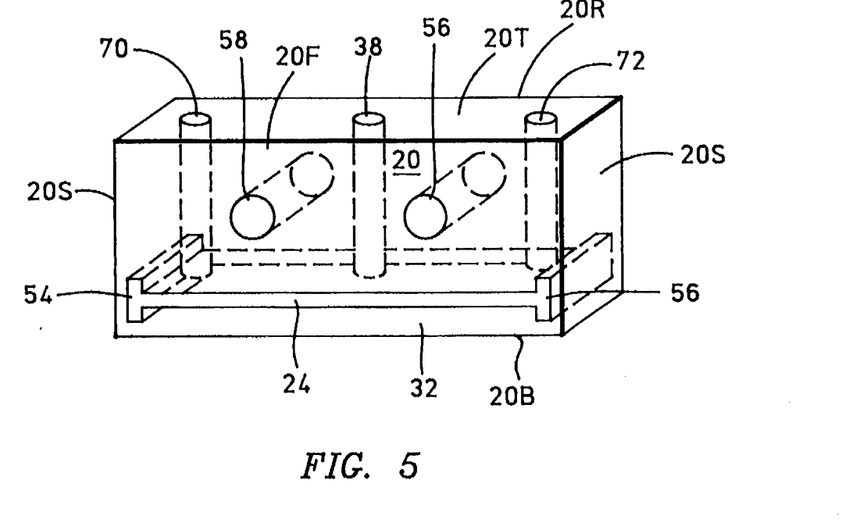
FIG. 5 is an isometric front view of the block portion of the present transfer tool.

FIGS. 3–6 show the present transfer tool which is an improvement of the transfer tool of FIGS. 1 and 2 described by U.S. Pat. No. 4,914,868. The improvement comprises two spaced-apart holes 70 and 72, one on each side of the central hole 38, which extend in depth through the block 20 from the top wall 20T to the elongated slot 24. The holes 38, 70, and 72 are aligned with respect to one another in a plane which is coextensive with the longitudinal axis 22 of the block. The holes 70 and 72 expose second and third beam portions 74 and 76, respectively, of the bearing surface 34 of the beam 32. Accordingly, there are three exposed portions of the beam 32, namely the central exposed portion 40, and the outside exposed portions 74 and 76 on each side thereof. The exposed portion 40 is centrally located on the bearing surface 34 of the beam while the exposed portions 74 and 76 of the bearing surface 34 are just inside the transverse slots 54 and 56, respectively. As shown in FIG. 4 pins 78 and 80 slidably extend through the holes 70 and 72 respectively and are the same as the central pin 38. The bottom end of the pin 78 engages the exposed beam portion 74 and the bottom end of the pin 80 engages the exposed beam portion 76. The top ends of the pins 78 and 80 are engaged by the actuators 46 and 48, respectively, for pushing the pins 78 and 80 downwardly to cause their bottom ends to bear downwardly on the exposed beam portions 74 and 76. Control of the downward forces applied by the actuators 44, 46 and 48 will be described in more detail hereinafter.

Figure 8:
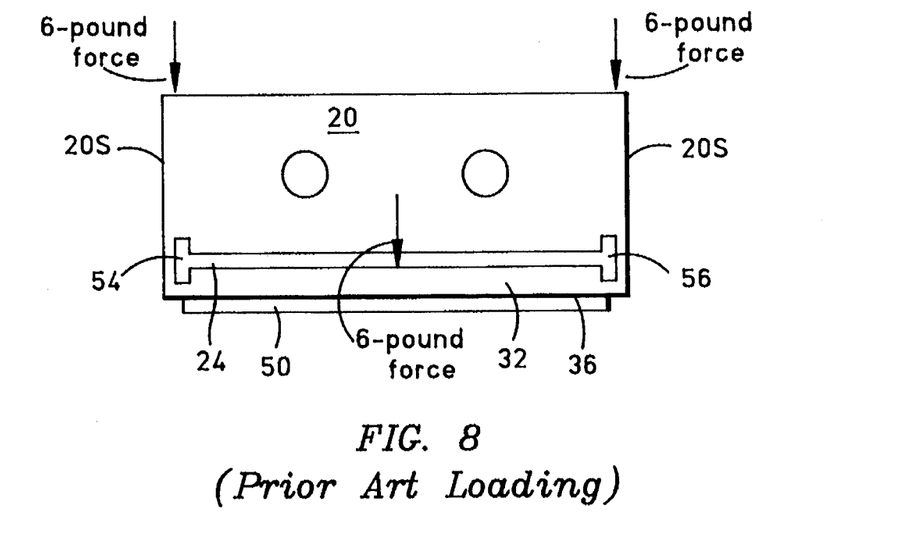
FIG. 8 is a diagrammatic illustration of forces applied to the beam and block of the prior art transfer tool according to the teachings of U.S. Pat. No. 4,914,868.

Two different tests were run, one test providing results from loading taught by U.S. Pat. No. 4,914,868 and the other test providing results from loading taught by the present invention. In FIG. 8, a 6 pound force was applied on a central location of the beam 32 and 6 pound forces were applied on top of the block near respective sides 20S. This caused a deformation of the slider row 50 attached to the lapping surface 36 of the block. The deformations of the slider row due to the loads applied in FIG. 8 are shown graphically in FIG. 9. The minimum deformation was at the center of the row, which was approximately 1.59 μm. The maximum deformation was at the ends of the row, with each end being deformed 70.06 μm. When end forces are applied to the top surface of the block to correct for positive row bow, the curvatures at the ends of the slider row are overcompensated causing the magnetic heads at the ends of the slider row to be overlapped. Accordingly, the deformations are very end-oriented and will result in overlapping of the magnetic heads at the ends of the slider row.

Figure 9:
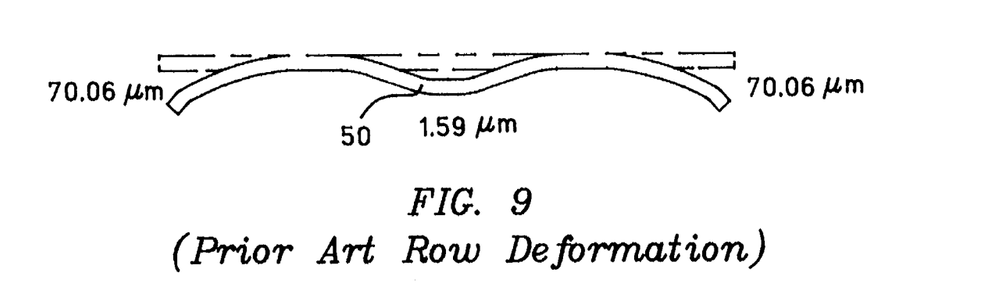
FIG. 9 is the row bow result due to the forces applied to the block of FIG. 8.
Figure 10:
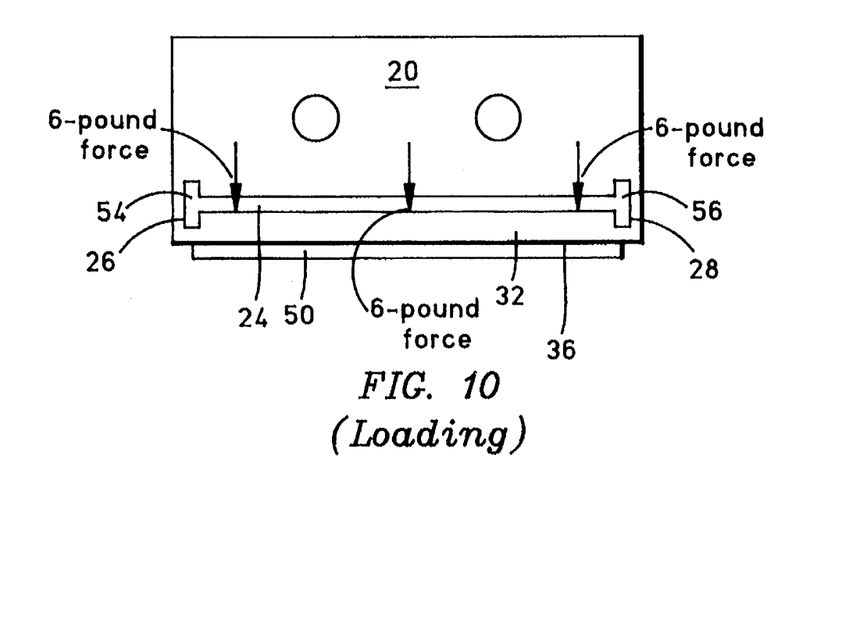
FIG. 10 is a diagrammatic illustration of forces applied to the beam of the present transfer tool to compensate for row bow.
Figure 11:
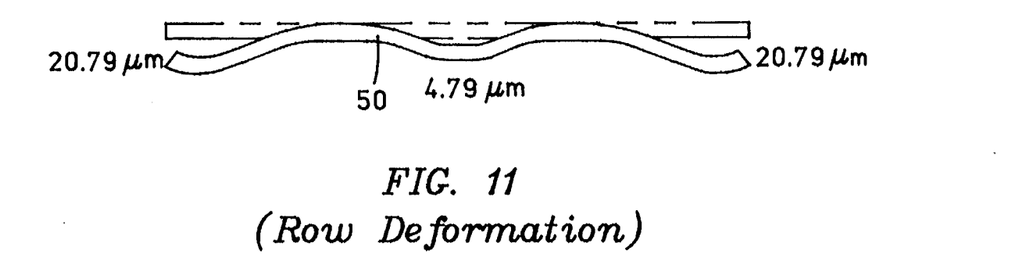
FIG. 11 is the row bow result due to the forces applied in FIG. 10.

In the other test, according to the teachings of the present invention, the loads were applied directly to the top of the beam 32 as illustrated in FIG. 10. A 6 pound force was applied at the middle of the beam and two 6 pound forces were applied one near each end of the beam on opposite sides of the middle force. The result of this test was that the slider row had a deformation at its center of 4.79 μm and end portions of the slider row had a deformation of 20.79 μm. Accordingly, the deformation near the ends of the slider row for the second test, shown in FIGS. 10 and 11, was approximately 40 percent of the deformation at the ends of the row for the first test, shown in FIGS. 8 and 9. Of equal importance was that the terminal ends of the row in the second test were not bent downwardly as shown in FIG. 11 as they were in the first test, as shown in FIG. 9. The downward curves of the terminal ends of the slider row in FIG. 9 cause a marked overlapping of the magnetic heads at these locations. The curved configurations of the end portions of the row shown in FIG. 11 are more desirable to lap than the downward curved ends shown in FIG. 9. The surprising result achieved from the test shown in FIGS. 10 and 11 is particularly due to the cooperation of the transverse slots 54 and 56 in cooperation with the end-loading of the beam. The transverse slots 54 and 56 allow for an easier bending of the beam 32 even though the loads are at the far ends of the beam close to these transverse slots. Accordingly, discrete loading directly on the beam 32 near each end 26 and 28 of the slot 24 results in less deformation and a curve which emulates the curve at the center of the slider row to a lesser degree. With the present invention, row bow of a slider row 50 can be more finely tuned compensated by the discrete loading at the center and at each end portion of the beam 32.

Figure 7:
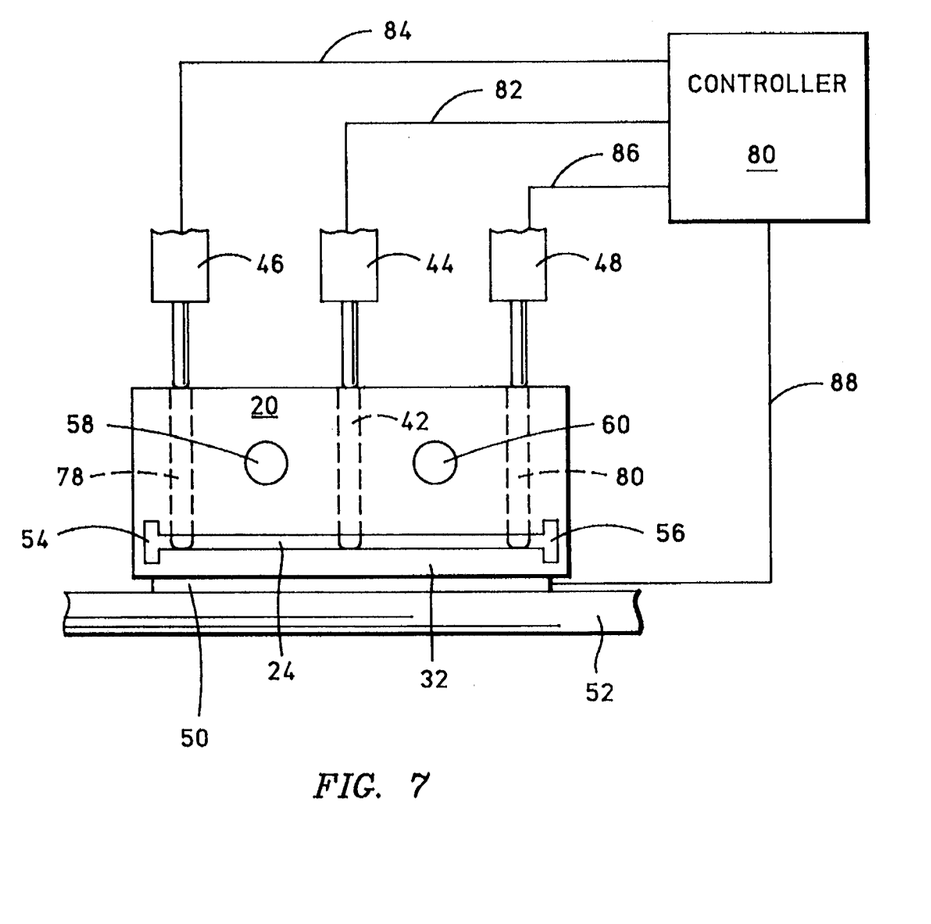
FIG. 7 is a block diagram of exemplary control circuitry connected to the present transfer tool for controlling forces on the beam of the transfer tool so as to compensate for row bow.

FIG. 7 illustrates the control set-up for applying appropriate loading to the pins 42, 78, and 80 via the actuators 44, 46, and 48, respectively. The actuators 44, 46, and 48 are connected to a controller 80 via leads 82, 84, and 86, respectively. Discrete elements (not shown), such as electronic lapping guides (ELG) or MR elements embedded in the slider row 50, are connected by a lead 88 to the controller 80 via a multiplexer (not shown). The discrete elements are spaced along the length of the row 50 and indicate by their resistance change or other electrical quantity the amount of material that has been lapped from different locations of the slider row along its length. These indications are fed to the controller 80 via the lead 88 which in turn controls the forces applied to the pins 42, 78, and 80 via the actuators 44, 46, and 48. For instance, if lapping was too much at the left end of the row 50, then the load applied by the actuator 46 would be relaxed so that the lapping would be more uniform between all of the magnetic heads on the slider row. Consequently, the loading by the actuators 44, 46, and 48 can be fine-tuned to lap all of the magnetic heads on the slider row in a uniform manner. It should be understood that additional pins and five actuators could be envisioned, such as a total of five pins and five actuators in which there would be two pins evenly spaced on each side of the middle pin. This would still further enhance the adjustment to compensate for row bow of a slider row 50.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A transfer tool for holding a slider row which carries a plurality of magnetic heads so that the slider row and the magnetic heads can be lapped, comprising:

an elongated substantially rectangular block having top and bottom surfaces bounded by front and rear walls and a pair of sidewalls, the block having a longitudinal axis;

an elongated slot extending in a plane substantially parallel to the longitudinal axis of the block and extending in width completely through the block from the front wall to the rear wall and having opposite ends which stop short of the sidewalls of the block;

the slot dividing the block into a top main body portion and a bottom beam portion, the bottom beam portion having a bearing surface located within the block and a lapping surface which is a portion of the bottom surface of the block, the beam being capable of being flexed transverse to the longitudinal axis of the block so that upon one or more predetermined loads being applied to the bearing surface of the beam the lapping face can be configured to desired shapes; and a plurality of spaced apart holes which extend in length through the block from the top wall to the elongated slot so as to expose a plurality of respective spaced apart exposed beam portions of the bearing surface of the beam to the top surface of the block.

2. A transfer tool as claimed in claim 1 including:

a plurality of pins extending through the plurality of spaced apart holes respectively with a bottom end of each pin engaging and being capable of bearing on a respective exposed beam portion of the bearing surface of the beam.

3. A transfer tool as claimed in claim 1 including:

said plurality of spaced apart holes comprising first, second and third spaced apart holes and said plurality of respective spaced apart exposed beam portions comprising first, second and third spaced apart exposed beam portions; and the first exposed beam portion of the bearing surface being substantially centrally located on the bearing surface of the beam and the other exposed beam portions of the bearing surface being located along a length of the beam on each side of the centrally located first exposed beam portion.

4. A transfer tool as claimed in claim 1 including:

a pair of spaced apart guide holes extending in length transverse to the longitudinal axis of the block completely through the block from front wall to rear wall.

5. A transfer tool as claimed in claim 1 including:

a slider row connected to the front lapping face of the beam; and the slider row having a length which is substantially equal to a length of the elongated slot.

6. A transfer tool as claimed in claim 1 including:

first and second transverse slots extending completely through the block from front wall to rear wall and located at the first and second ends of said elongated slot, each of the first and second transverse slots extending in length substantially perpendicular to the longitudinal axis of said elongated slot; and all of said plurality of said spaced apart exposed beam portions being located between the first and second transverse slats.

7. A transfer tool as claimed in claim 6 including:

said plurality of spaced apart holes comprising first, second and third spaced apart holes and said plurality of respective spaced apart exposed beam portions comprising first, second and third spaced apart exposed beam portions; and the first exposed beam portion of the bearing surface being substantially centrally located on the bearing surface of the beam and the other exposed beam portions of the bearing surface being located along a length of the beam on each side of the centrally located first exposed beam portion.

8. A transfer tool as claimed in claim 7 including:

at least first, second and third pins extending through the first, second and third holes respectively with a bottom end of each of the first, second and third pins engaging and being capable of bearing on the first, second and third exposed beam portions respectively of the bearing surface of the beam.

9. A magnetic head lapping apparatus for lapping magnetic heads on a slider row comprising:

an elongated substantially rectangular block having top and bottom surfaces bounded by front and rear walls and a pair of sidewalls, the block having a longitudinal axis;

an elongated slot extending in a plane substantially parallel to the longitudinal axis of the block and extending in width completely through the block from the front wall to the rear wall and having opposite ends which stop short of the sidewalls of the block;

the slot dividing the block into a top main body portion and a bottom beam portion, the bottom beam portion having a bearing surface located within the block and a lapping surface which is a portion of the bottom surface of the block, the beam being capable of being flexed transverse to the longitudinal axis of the block so that upon one or more predetermined loads being applied to the bearing surface of the beam the lapping face can be configured to desired shapes:

a plurality of spaced apart holes which extend in length through the block from the top wall to the elongated slot so as to expose a plurality of respective spaced apart exposed beam portions of the bearing surface of the beam to the top surface of the block;

a plurality of pins extending through the plurality of spaced apart holes respectively with a bottom end of each pin engaging and being capable of bearing on a respective exposed beam portion of the bearing surface of the beam; and means operatively connected to each of the pins for forcing the pins downwardly with their bottom ends bearing on one or more of the exposed beam portions of the bearing surface with one or more selected pressures to establish a desired shape of said lapping face of the beam.

10. A magnetic head lapping apparatus for lapping magnetic heads on a slider row comprising:

an elongated substantially rectangular block having top and bottom surfaces bounded by front and rear walls and a pair of sidewalls, the block having a longitudinal axis;

an elongated slot extending in a plane substantially parallel to the longitudinal axis of the block and extending in width completely through the block from the front wall to the rear wall and having opposite ends which stop short of the sidewalls of the block;

the slot dividing the block into a top main body portion and a bottom beam portion, the bottom beam portion having a bearing surface located within the block and a lapping surface which is a portion of the bottom surface of the block, the beam being capable of being flexed transverse to the longitudinal axis of the block so that upon one or more predetermined loads being applied to the bearing surface of the beam the lapping face can be configured to desired shapes:

at least first, second and third spaced apart holes which extend in length through the block from the top wall to the elongated slot so as to expose first, second and third exposed portions of the bearing surface of the beam to the top surface of the block;

the first exposed beam portion of the bearing surface being substantially centrally located on the bearing surface of the beam and the other exposed beam portions of the bearing surface being located along a length of the beam on each side of the centrally located first exposed beam portion:

a plurality of pins extending through the plurality of spaced apart holes respectively with a bottom end of each pin engaging and being capable of bearing on a respective exposed beam portion of the bearing surface of the beam:

at least first, second and third pins extending through the first, second and third holes respectively with a bottom end of each of the first, second and third pins engaging and being capable of bearing on the first, second and third exposed portions respectively of the bearing surface of the beam; and means operatively connected to each of the first, second and third pins for forcing the pins downwardly with their bottom ends bearing on one or more of the first, second and third exposed portions of the bearing surface with one or more selected pressures to establish a desired shape of the slider row mounted on the lapping face of the beam.

11. A lapping apparatus as claimed in claim 10 including:
a slider row with magnetic heads connected to the front lapping face of the beam; and
the slider row having a length which is substantially equal to a length of the elongated slot.

12. A lapping apparatus as claimed in claim 11 including:
a pair of spaced apart guide holes extending in length transverse to the longitudinal axis of the block completely through the block from front wall to rear wall.

* * * * *

UNITED STATES PATENT AND TRADEMARK OFFICE
CERTIFICATE OF CORRECTION

PATENT NO. : 5,525,091
DATED : June 11, 1996
INVENTOR(S) : Lam et al.

It is certified that error appears in the above-indentified patent and that said Letters Patent is hereby corrected as shown below:

Column 7, line 25, change "slats" to --slots--.

Signed and Sealed this

Twelfth Day of November, 1996

Attest:

BRUCE LEHMAN

*Attesting Officer*       *Commissioner of Patents and Trademarks*